(12) United States Patent
Kim

(10) Patent No.: US 7,681,557 B2
(45) Date of Patent: Mar. 23, 2010

(54) CANISTER FOR VEHICLE

(75) Inventor: Chang Han Kim, Gwangju (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/272,495

(22) Filed: Nov. 17, 2008

(65) Prior Publication Data
US 2009/0260602 A1  Oct. 22, 2009

(30) Foreign Application Priority Data
Apr. 17, 2008  (KR) .................. 10-2008-0035766

(51) Int. Cl.
F02M 33/02 (2006.01)
B01D 53/02 (2006.01)

(52) U.S. Cl. .............. 123/519; 296/193.07; 96/151

(58) Field of Classification Search .............. 123/516, 123/518–519, 520; 96/151; 55/385.3; 296/193.07, 296/204
See application file for complete search history.

(56) References Cited

U.S. PATENT DOCUMENTS

| | | | | |
|---|---|---|---|---|
| 3,757,753 A * | 9/1973 | Hunt | ................. | 123/519 |
| 4,787,643 A * | 11/1988 | Shirata | ................. | 280/834 |
| 4,852,761 A * | 8/1989 | Turner et al. | ................. | 220/746 |
| 4,919,103 A * | 4/1990 | Ishiguro et al. | ................. | 123/514 |
| 5,060,620 A * | 10/1991 | Oslapas | ................. | 123/519 |
| 5,111,900 A * | 5/1992 | Leitermann | ................. | 180/69.4 |
| 5,224,455 A * | 7/1993 | Ogasawara | ................. | 123/519 |
| 5,901,689 A * | 5/1999 | Kimura et al. | ................. | 123/518 |
| 6,182,693 B1 * | 2/2001 | Stack et al. | ................. | 137/565.17 |
| 6,273,070 B1 * | 8/2001 | Arnal et al. | ................. | 123/519 |
| 6,302,144 B1 * | 10/2001 | Graham et al. | ................. | 137/565.17 |
| 6,354,280 B1 * | 3/2002 | Itakura et al. | ................. | 123/519 |
| 6,367,458 B1 * | 4/2002 | Furusho et al. | ................. | 123/519 |
| 6,395,072 B2 * | 5/2002 | Miura et al. | ................. | 96/133 |
| 6,435,365 B2 * | 8/2002 | Pachciarz et al. | ................. | 220/4.14 |
| 6,463,915 B2 * | 10/2002 | Ozaki et al. | ................. | 123/519 |
| 6,739,350 B1 * | 5/2004 | Op De Beeck et al. | ...... | 137/202 |
| 7,047,948 B2 * | 5/2006 | Gerhardt et al. | ................. | 123/516 |
| 7,143,750 B2 * | 12/2006 | Brunel et al. | ................. | 123/509 |
| 7,213,583 B2 * | 5/2007 | Mills | ................. | 123/518 |
| 7,320,314 B2 * | 1/2008 | Kashima et al. | ................. | 123/519 |
| 7,341,046 B2 * | 3/2008 | Leymarie et al. | ................. | 123/509 |
| 7,367,324 B2 * | 5/2008 | Izutani et al. | ................. | 123/509 |
| 7,625,037 B2 * | 12/2009 | Gollehur et al. | ................. | 296/193.07 |
| 2001/0029932 A1 * | 10/2001 | Ozaki et al. | ................. | 123/520 |
| 2006/0197361 A1 * | 9/2006 | Ito et al. | ................. | 296/193.07 |
| 2008/0000703 A1 * | 1/2008 | Shindou | ................. | 180/68.5 |
| 2008/0264583 A1 * | 10/2008 | Knobel et al. | ................. | 160/368.1 |

* cited by examiner

*Primary Examiner*—Thomas N Moulis
(74) *Attorney, Agent, or Firm*—Morgan, Lewis & Bockius LLP

(57) ABSTRACT

A canister for a vehicle may include a cover member covering a hole formed at a floor panel corresponding to a fuel pump module mounted on a fuel tank, and a main body integrally formed at a lower surface of the cover member, and connected to the fuel pump module through a hose so as to collect evaporation gas generated in the fuel tank and supply the evaporation gas to an intake line.

14 Claims, 4 Drawing Sheets

CANISTER FOR VEHICLE

CROSS-REFERENCE TO RELATED APPLICATION

This application is based on and claims priority to Korean Patent Application No. 10-2008-0035766 filed Apr. 17, 2008, the entire contents of which applications is incorporated herein for all purposes by this reference.

BACKGROUND OF THE INVENTION

1. Field of the Invention

The present invention relates to a canister for a vehicle. More particularly, the present invention relates to a canister for a vehicle that collects evaporation gas generated in a fuel tank and supplies the evaporation gas to an intake line.

2. Description of Related Art

Generally, fuel used to power a vehicle is stored in a fuel tank mounted to the vehicle.

The fuel tank has generally been made of metal materials. More recently, fuel tanks have been constructed using plastic materials, which are lighter than metal materials, in order to reduce the weight of the fuel tank.

In conventional systems, the fuel tank is generally provided with a fuel pump module for pressure-feeding fuel, e.g. gasoline, to an engine, and a canister for collecting evaporation fuel and directing it to an intake line.

As the fuel tank is generally mounted at a lower surface of a floor panel of a vehicle body, the floor panel is generally provided with a hole for maintenance and repair of the fuel pump module. The hole is formed at the floor panel corresponding to an upper surface of the fuel pump module, and a cover is mounted at the hole.

Meanwhile, a conventional canister is provided with a main body mounted at a side surface of the fuel tank, and the main body is generally connected to the fuel pump module and the intake line through hoses.

As the main body is generally manufactured separately from the fuel tank and is mounted to the fuel tank in the case of conventional canisters, investment for manufacturing molds and equipment of the main body may increase.

In addition, since a process for mounting the main body to the fuel tank is separate from a process for connecting the main body to the fuel pump module through hoses in the case of conventional canisters, the assembly processes may be complex, productivity may be deteriorated, and production costs may increase.

As the shape of the fuel tank generally must be greatly changed (e.g., a part of the fuel tank removed), setting the mounting position of the main body to the fuel tank of conventional canisters, may decrease the volume of the fuel tank, may increase flow noise of the fuel, and may deteriorate durability and impact performance of the fuel tank.

Further, as the mounting position of the main body is limited to a side or corner of the fuel tank in conventional canisters, longer hoses connecting the main body to the fuel pump module may be necessary and thereby production costs may further increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a canister for a vehicle having an integrally formed main body and cover for maintenance and repair of a fuel pump module.

An aspect of the present invention is directed to a canister for a vehicle that may include a cover member covering a hole formed at a floor panel corresponding to a fuel pump module mounted on a fuel tank, and/or a main body integrally formed at a lower surface of the cover member, and connected to the fuel pump module through a hose so as to collect evaporation gas generated in the fuel tank and supply the evaporation gas to an intake line.

The main body may have a cross-section of a semicircular shape and may protrude from the lower surface of the cover member. The main body may penetrate the floor panel and may be disposed above the fuel pump module. The main body may be disposed apart from an upper plate of the fuel pump module by a predetermined distance.

The cover member may include a first section on which the main body is formed and a second section that is a remainder of the cover member excluding the first section.

The main body may include a wall having a semicircular cross-section protruding from the lower surface of the cover member, a bottom plate coupled to a lower end of the wall so as to form an interior space therebetween, a pair of baffle plates extending from the wall into the interior space and disposed apart from each other, charcoal disposed in regions divided by the baffle plates, and/or first, second, and third ports formed in the wall corresponding respectively to the regions divided by the baffle plates.

The cover member and the wall may be made by injection molding and may be made of plastic materials. The bottom plate may be bonded to the lower end of the wall, and cooperating bonding flanges may be formed on the lower end of the wall and the bottom plate. The canister may further include a filter fixed to an interior surface of the wall for filtering the evaporation gas. The first port may be connected to the fuel pump module through a first hose, the second port may be connected to the intake line through a second hose, and the third port may be provided with an air filter for filtering air flowing into the main body.

A double-sided adhesive tape for adhering to a border of the hole of the floor panel may extend along a lower edge of the cover member. The double-sided adhesive tape may be a butyl tape.

The main body integrated with the cover member may be connected to the fuel tank and the intake line of a vehicle.

Other aspects of the present invention are directed to vehicles including the above-described canisters.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
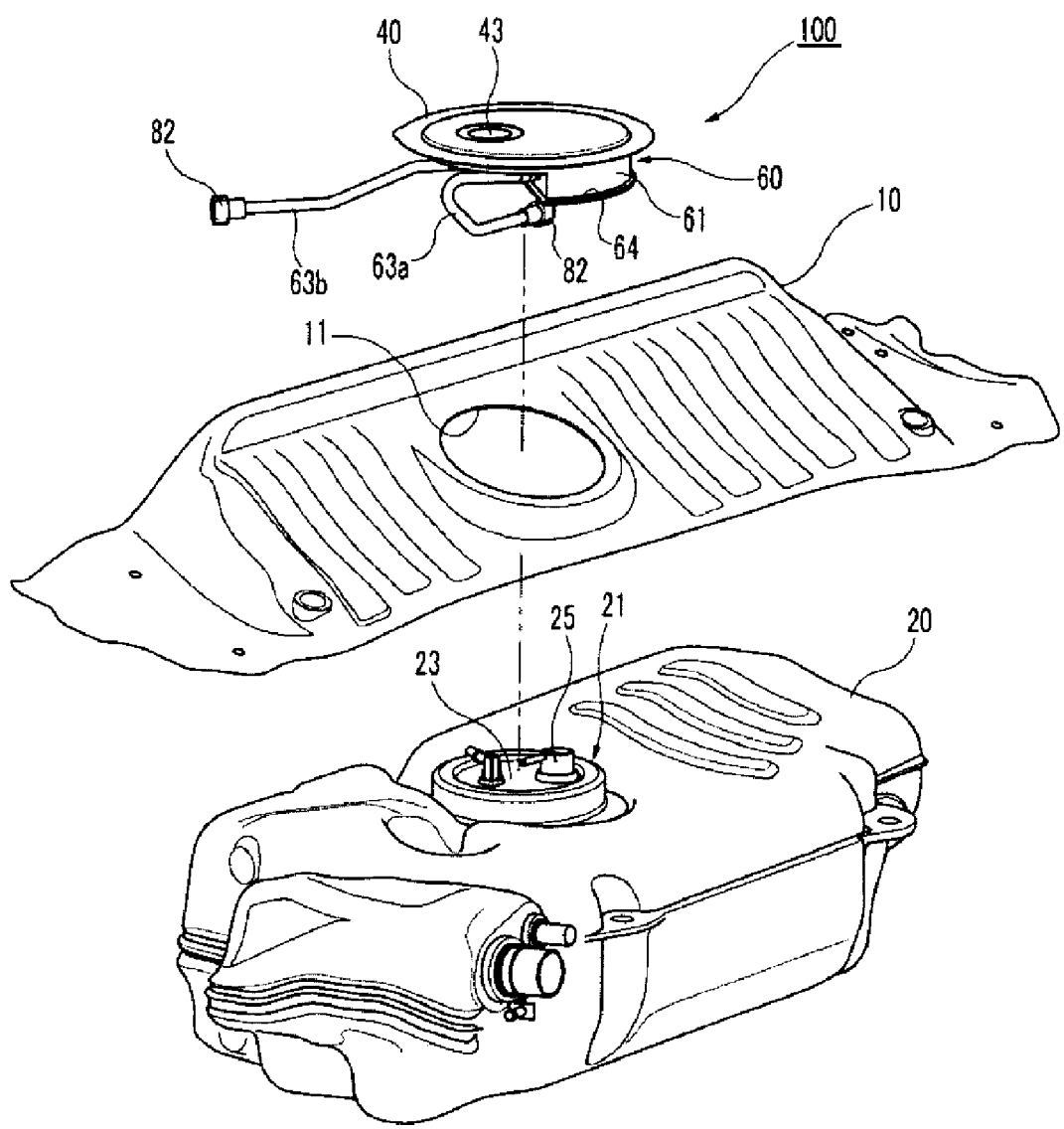
FIG. 1 is an exploded perspective view showing installation of an exemplary canister for a vehicle according to the present invention.

FIG. 1 is an exploded perspective view showing installation of a canister for a vehicle according to an exemplary embodiment of the present invention.

Referring to the drawings in general, a canister 100 for a vehicle according to various embodiments of the present invention is useful in conjunction with a fuel tank 20 of a vehicle that uses gasoline fuel.

Canister 100 can be used to collect evaporation fuel gas (hereinafter called "evaporation gas" for convenience) generated in the fuel tank 20 and to send the evaporation gas to an intake line.

According to various embodiments of the present invention, one would appreciate that the intake line may be an otherwise conventional intake device, and thus a detailed explanation thereof is omitted.

In exemplary systems, the fuel tank 20 is mounted on a lower surface of a floor panel 10 of a vehicle body. The fuel tank 20 may be made of plastic and/or metal materials, and provided with a fuel pump module 21 for pressure-feeding fuel to the vehicle engine. The fuel pump module 21 may be inserted and mounted onto the body of the fuel tank 20, and an upper plate 23 of the fuel pump module 21 may be positioned so as to face the lower surface of the floor panel 10.

In addition, a valve unit 25 for exhausting evaporation gas generated in the fuel tank 20 may be provided at the upper plate 23 of the fuel pump module 21. One will appreciate that the fuel pump module may be an otherwise conventional fuel pump, and thus a detailed explanation thereof is omitted.

The floor panel 10 may be the rear floor panel of the vehicle body, and a hole 11 may be formed in floor panel 10 at a position corresponding to the upper plate 23 of the fuel pump module 21 to provide access to the fuel pump module 21.

The canister 100, which can be used in conjunction with the fuel tank 20 of a vehicle, may include a cover member 40 and a main body 60 integrally formed with the cover member 40. According to various embodiments of the present invention, the cover member 40 is useful for covering hole 11 in the floor panel 10, and is commonly referred to as an "AS cover (after service cover)."

Figure 2:
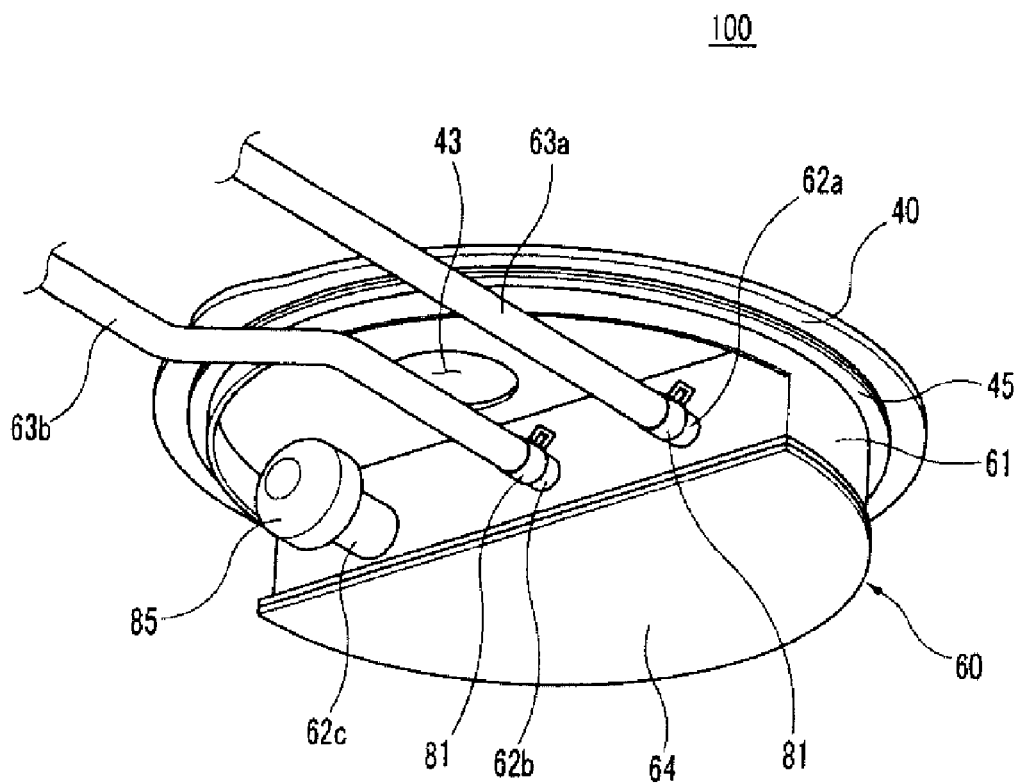
FIG. 2 is a perspective view of an exemplary canister for a vehicle according to the present invention.
Figure 3:
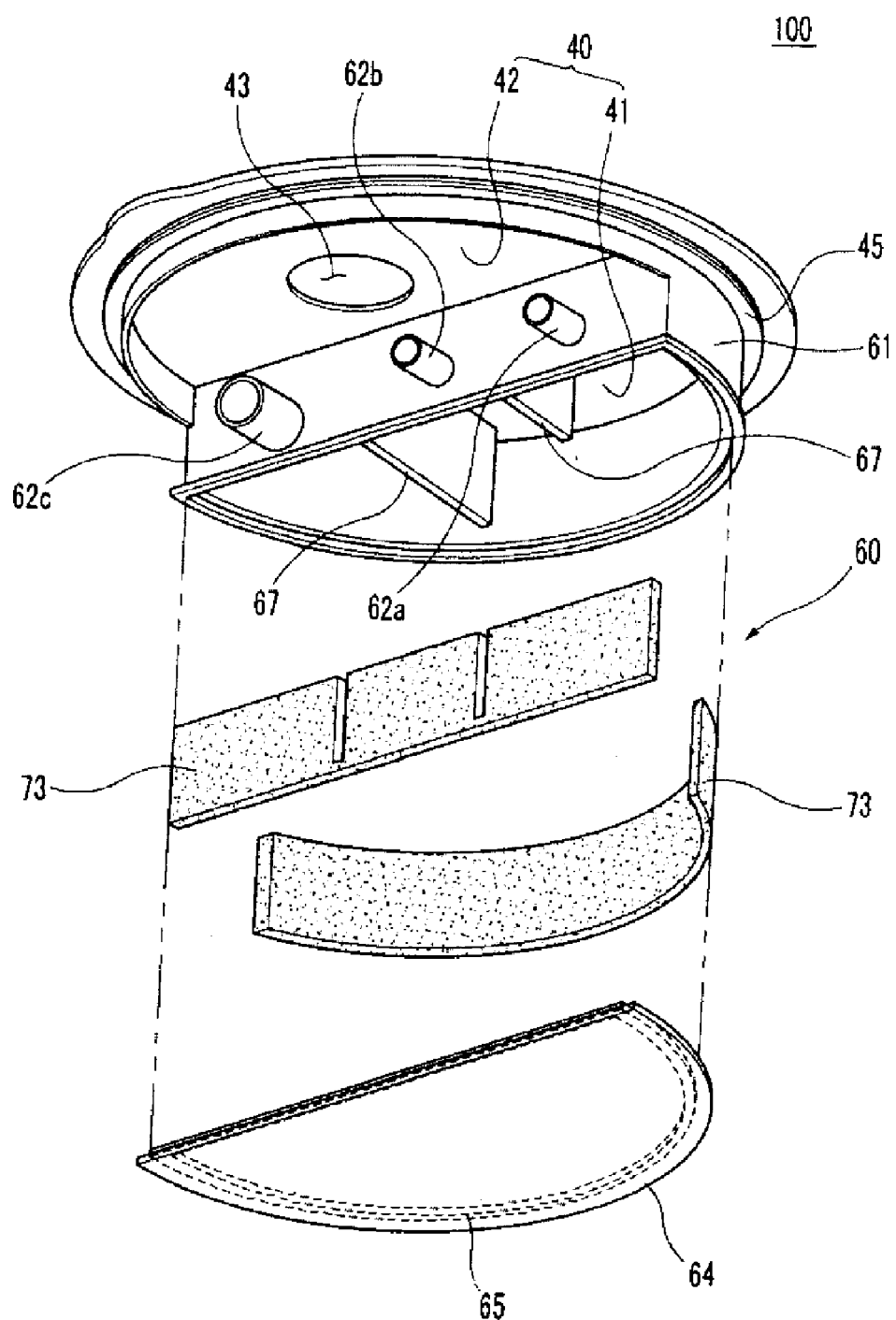
FIG. 3 is an exploded perspective view of an exemplary canister for a vehicle according to the present invention.
Figure 4:
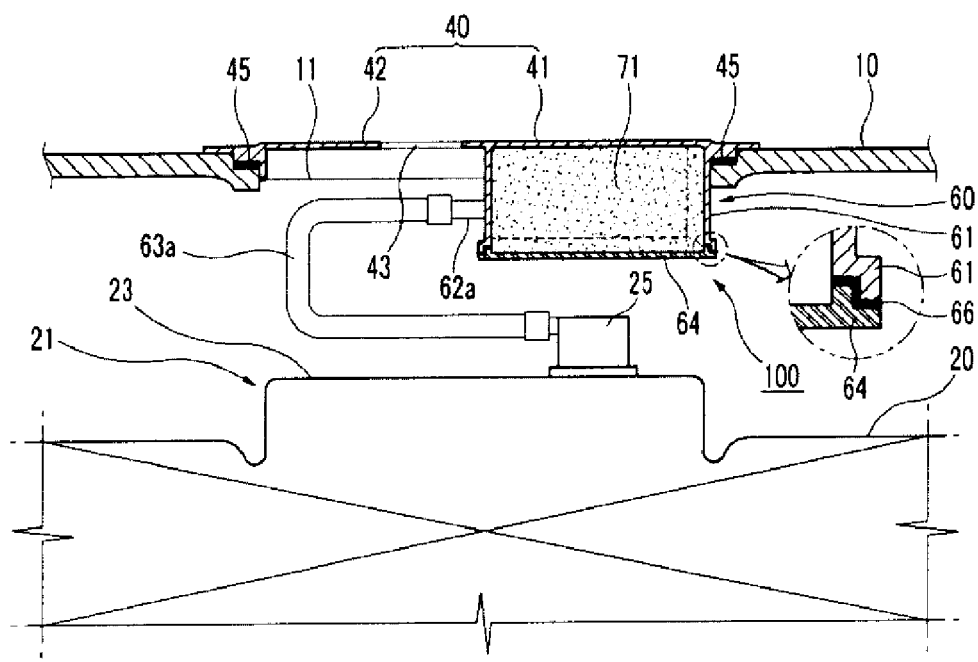
FIG. 4 is a schematic diagram showing the structure of an exemplary system including the canister shown in FIG. 1 according to the present invention.

While the cover member 40 may adopt a variety of shapes or configurations, in some embodiments of the invention, cover member 40 may be circular as shown in FIG. 2 and FIG. 3 and made of plastic materials.

The cover member 40 may include a first section 41 on which the main body 60 is formed and a second section 42 that is a remainder of the cover member excluding the first section 41. A grip hole 43 for opening or closing the hole 11 of the floor panel 10, to allow for maintenance and repair of the fuel pump module 21 may be formed in the second section 42 of cover member 40.

To adhere cover member 40 to the border of the hole 11 in the floor panel 10, double-sided adhesive tape 45 may be provided along a lower edge of the cover member 40.

One will appreciate that the double-sided adhesive tape can be made of any suitable materials, for example, butyl tape, and of a suitable width. In some embodiments of the invention, one surface of the double-sided adhesive tape 45 would contact the lower edge of cover member 40, while the opposite surface would contact the border of hole 11.

According to various embodiments of the present invention, the main body 60 can be used to recover the evaporation gas generated in the fuel tank 20 and to supply the evaporation gas to the intake line. The main body 60, as shown in FIG. 1 to FIG. 4, may be integrally formed with the lower surface of cover member 40 and is connected to the fuel pump module 21 of fuel tank 20. In various embodiments, the main body may be monolithically formed with the cover member.

The main body 60 may adopt a configuration having a semicircular cross-section and protrudes from the first section 41 of the lower surface of the cover member 40. In some embodiments of the invention, the main body 60, when in position, may be attached to the edge of hole 11 as the cover member 40 is in place over hole 11 of floor panel 10. In this manner, the main body 60 is disposed above the fuel pump module 21. The main body 60 may therefore be positioned through the hole 11 in floor panel 10 and be disposed a predetermined distance away from the upper plate 23 of fuel pump module 21.

According to various embodiments of the present invention, the main body 60 of canister 100 may include a wall 61, a bottom plate 64, one or more baffle plate(s) 67, and charcoal 71. In exemplary configurations wherein the wall 61 is integrally formed with cover member 40, wall 61 may protrude from the lower surface of first section 41 and adopt a configuration having a semicircular cross-section.

The wall 61 may be constructed from plastic materials that are the same as those of the cover member 40. One will appreciate that the wall may be manufactured together with the cover member by means of otherwise conventional injection molding methods, and other suitable means. The bottom plate 64 may be made of plastic materials that are the same as those of wall 61, and is coupled to a lower end of the wall 61 so as to form an interior space therebetween.

Cooperating bonding flanges may be formed on the lower end of wall 61 and bottom plate 64. In other embodiments of the invention, the bottom plate 64 is heat bonded to the lower end of the wall 61 by means of bonding protrusions 65 formed at the edge of the bottom plate 64 corresponding to the lower end of the wall 61, which are melted to heat bond the bottom plate 64 to the lower end of wall 61. Optionally, a bonding portion 66, where the bonding protrusions 65 are located, may be melted and then cooled to form a connecting region at the lower end of the wall 61 and the bottom plate 64.

A pair of baffle plates 67 may be provided, and are, in some instances, integrally formed with wall 61. In some instances, one baffle plate 67 may be disposed apart from the other baffle plate 67 in the wall part 61.

In various embodiments, one or more baffle plates may be monolithically formed with the wall. The baffle plate(s) 67 extend from the wall 61 and may be disposed apart from each other so as to divide the interior space of the main body 60 into a plurality of connected regions, thereby enhancing fluidity of the evaporation gas that flows into the interior space.

Charcoal 71 may be used to fill the regions divided by baffle plates 67 for absorbing the evaporation gas flowing through the interior space of the main body 60. Additionally, the canister 100 may further include a filter 73 that lines the interior surface of wall 61 to filter the evaporation gas that flows into and is collected in the interior space of the main body 60. Furthermore, first, second, and third ports 62a, 62b, and 62c corresponding to the regions divided by the baffle plates 67 may be formed in wall 61 to permit the outgoing and incoming flow of evaporation gas.

In exemplary systems, the first port 62a is an inlet port through which the evaporation gas flows in and is connected to the valve unit 25 of the fuel pump module 21 through a first hose 63a. The second port 62b is an outlet port through which the evaporation gas flows out and is connected to the intake line through a second hose 63b. In addition, the third port 62c is an inlet port left open to atmosphere. If negative pressure in the fuel tank 20 is excessive, air flows into the main body 60 through the third port 62c and thereby internal pressure of fuel tank 20 is maintained appropriately. In some embodiments of the invention, canister 100 may further include an air filter 85 mounted at the third port 62c.

Hereinafter, manufacturing and assembling processes of the canister 100 for a vehicle according to various embodiments of the present invention will be described.

In some embodiments of the invention, the process of manufacturing the canister 100 for a vehicle according to various embodiments of the present invention begin with simultaneously injection molding the cover member 40 and the wall 61 of main body 60. At this time, the baffle plates 67, the first port 62a, the second port 62b, and the third port 62c are integrally formed with wall 61, and the lower end of the wall 61 is left open. In various embodiments, the ports may be monolithically formed with the wall. In the next step, the filter 73 is fixed to the interior surface of the wall 61 and charcoal 71 is inserted in the regions divided by the baffle plates 67. In canister(s) 100 having the bonding protrusions 65 described herein, the bonding protrusions 65 are fitted to the lower end of wall 61 and melted by heat such that the bottom plate 64 is bonded to the lower end of the wall 61. In addition, the double-sided adhesive tape 45 may also be attached to the lower edge of the cover member 40.

The canister 100 for a vehicle in which the cover member 40 and the main body 60 are integrally formed can be manufactured therefore using the above described methods. One will appreciate that other suitable methods may also be used in accordance with the present invention.

Assembling processes of the canister 100 for a vehicle according to various embodiments of the present invention will now be described. According to various embodiments of the present invention, the fuel tank 20 is mounted on the lower surface of the floor panel 10. Upper plate 23 of the fuel pump module 21 may correspond to hole 11 of the floor panel 10. In this state, the first hose 63a may be connected to the first port 62a of the wall 61 by means of a clip 81 and connected to the valve unit 25 of the fuel pump module 21 by means of a connector 82. The second hose 63b may be connected to the second port 62b of the wall 61 by means of a clip 81 and the air filter 85 mounted at the third port 62c. In an exemplary system, the second hose 63b is connected to the intake line by means of a connector 82.

Finally, the cover member 40 is attached to the border of hole 11 of the floor panel 10 by using the double-sided adhesive tape 45, and the canister 100 for a vehicle according to various embodiments of the present invention is thereby assembled.

According to various embodiments of the invention, since the cover member 40 covers hole 11 of the floor panel 10 and the main body 60 is attached to the border of the hole 11 by means of the double-sided adhesive tape 45, the main body 60 is therefore disposed above the fuel pump module 21. The main body 60 penetrates the floor panel 10 and may be a predetermined distance from the upper plate 23 of the fuel pump module 21.

Therefore, the canister 100 for a vehicle according to various embodiments of the present invention can collect the evaporation gas generated in the fuel tank 20 and send the evaporation gas to the intake line by means of negative pressure in the intake line. Since the main body is monolithically formed with the cover member according to various embodiments of the present invention, molds for the cover and the canister need not be manufactured separately and production cost may be curtailed.

In addition, since the cover member is attached to the border of the hole of the floor panel according to various embodiments of the present invention, the main body penetrates the floor panel and is disposed above the fuel pump module. Therefore, the mounting position of the canister to the fuel tank is less restricted, the shape of the fuel tank not greatly changed (e.g., a part of the fuel tank need not be removed), volume of the fuel tank may be maximized, flowing noise of fuel may decrease, and durability and impact performance of the fuel tank may be enhanced.

The distance between the main body and the fuel pump module may also be shortened according to various embodiments of the present invention, which permits use of a shorter length hose connecting the main body to the fuel pump module and curtailed production cost.

Furthermore, processes for assembling the cover member to the vehicle body and processes for connecting the hoses to the main body and the fuel pump module are simultaneously performed according to various embodiments of the present invention. As such, assembly is simplified, productivity improved, and production cost further curtailed.

For convenience in explanation and accurate definition in the appended claims, the terms "upper" or "lower", "side", "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A canister for a vehicle, comprising:
   a cover member covering a hole formed at a floor panel corresponding to a fuel pump module mounted on a fuel tank; and
   a main body integrally formed at a lower surface of the cover member, and connected to the fuel pump module through a hose so as to collect evaporation gas generated in the fuel tank and supply the evaporation gas to an intake line.

2. The canister of claim 1, wherein the main body has a cross-section of a semicircular shape and protrudes from the lower surface of the cover member.

3. The canister of claim 1, wherein the main body penetrates the floor panel and is disposed above the fuel pump module.

4. The canister of claim 3, wherein the main body is disposed apart from an upper plate of the fuel pump module by a predetermined distance.

5. The canister of claim 2, wherein the cover member comprises a first section on which the main body is formed and a second section that is a remainder of the cover member excluding the first section.

6. The canister of claim 1, wherein the main body comprises:
   a wall having a semicircular cross-section and protruding from the lower surface of the cover member;
   a bottom plate coupled to a lower end of the wall so as to form an interior space therebetween;
   a pair of baffle plates extending from the wall into the interior space and disposed apart from each other;
   charcoal disposed in regions divided by the baffle plates; and
   first, second, and third ports formed in the wall corresponding respectively to the regions divided by the baffle plates.

7. The canister of claim 6, wherein the cover member and the wall are made by injection molding and are made of plastic materials.

8. The canister of claim 6, wherein the bottom plate is bonded to the lower end of the wall, and cooperating bonding flanges are formed on the lower end of the wall and the bottom plate.

9. The canister of claim 6 further comprising a filter fixed to an interior surface of the wall for filtering the evaporation gas.

10. The canister of claim 6, wherein the first port is connected to the fuel pump module through a first hose, the second port is connected to the intake line through a second hose, and the third port is provided with an air filter for filtering air flowing into the main body.

11. The canister of claim 6, wherein a double-sided adhesive tape for adhering to a border of the hole of the floor panel extends along a lower edge of the cover member.

12. The canister of claim 11, wherein the double-sided adhesive tape is a butyl tape.

13. The canister of claim 1, wherein the main body integrated with the cover member is connected to the fuel tank and the intake line of a vehicle.

14. A vehicle comprising the canister of claim 1.

* * * * *